United States Patent
Lai et al.

(10) Patent No.: US 8,204,083 B2
(45) Date of Patent: Jun. 19, 2012

(54) NETWORK CONNECTION APPARATUS AND COMMUNICATION SYSTEM AND METHOD APPLYING THE SAME

(75) Inventors: Shua-Yuan Lai, Miaoli County (TW); Han-Chiang Chen, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 207 days.

(21) Appl. No.: 12/436,852

(22) Filed: May 7, 2009

(65) Prior Publication Data

US 2010/0098202 A1  Apr. 22, 2010

(30) Foreign Application Priority Data

Oct. 21, 2008 (TW) ................ 97140355 A

(51) Int. Cl.
*H04J 3/06* (2006.01)
(52) U.S. Cl. ........ 370/503; 709/219
(58) Field of Classification Search .......... 370/503, 370/465, 389; 709/219
See application file for complete search history.

(56) References Cited

U.S. PATENT DOCUMENTS

| | | | |
|---|---|---|---|
| 6,408,355 B1 | 6/2002 | Toguchi | |
| 6,836,747 B2 | 12/2004 | Suzuki | |
| 7,539,457 B2 * | 5/2009 | Lim et al. | 455/41.2 |
| 7,730,230 B1 * | 6/2010 | Kondapalli | 710/15 |
| 2001/0040879 A1 * | 11/2001 | Miyamoto et al. | 370/337 |
| 2002/0172218 A1 | 11/2002 | Harrison | |
| 2004/0233905 A1 | 11/2004 | Weber | |
| 2007/0008993 A1 | 1/2007 | Cha et al. | |
| 2007/0058929 A1 | 3/2007 | Chaffee | |
| 2007/0064851 A1 | 3/2007 | Hall, II | |
| 2007/0291713 A1 * | 12/2007 | Machida | 370/338 |
| 2008/0162668 A1 * | 7/2008 | Miller | 709/219 |

FOREIGN PATENT DOCUMENTS

| | | |
|---|---|---|
| JP | 07-015421 | 1/1995 |
| JP | 2000-031990 | 1/2000 |
| JP | 2002-314552 | 10/2002 |
| JP | 2004-503988 | 2/2004 |
| JP | 2004-146883 | 5/2004 |
| JP | 2004-260380 | 9/2004 |
| JP | 2007-020183 | 1/2007 |

OTHER PUBLICATIONS

Japanese language office action dated Jun. 30, 2011.
English language translation of office action.
English language translation of abstract of JP 2000-031990 (published Jan. 28, 2000).
English language translation of JP 2002-314552 (published Oct. 25, 2002).

(Continued)

*Primary Examiner* — Dang Ton
*Assistant Examiner* — Wei Zhao
(74) *Attorney, Agent, or Firm* — Thomas|Kayden

(57) ABSTRACT

In a communication network, a network connection apparatus accepts timing information of a grand master to achieve timing synchronization. Next, the network connection apparatus requests slave nodes to be in timing synchronization with itself to achieve the timing synchronization. Even when the grand master is removed or crashed, when a new slave node is added, or when a hack node tries to hack the communication network, the network connection apparatus still periodically requests the slave nodes to be in timing synchronization with itself so that the timing synchronization inside the communication network is not negatively affected.

29 Claims, 5 Drawing Sheets

OTHER PUBLICATIONS

English language translation of abstract of JP 2004-503988 (published Feb. 5, 2004).
English language translation of abstract of JP 2004-146883 (published May 20, 2004).
English language translation of abstract of JP 2007-020183 (published Jan. 25, 2007).
Japanese Office Action dated Feb. 2, 2012 (with English language translation).

* cited by examiner

NETWORK CONNECTION APPARATUS AND COMMUNICATION SYSTEM AND METHOD APPLYING THE SAME

This application claims the benefit of Taiwan application Serial No. 97140355, filed Oct. 21, 2008, the subject matter of which is incorporated herein by reference.

TECHNICAL FIELD

The disclosure relates to a network connection apparatus, and a communication system and a communication method applying the same.

BACKGROUND

In the factory automation control and the Intranet measurement (LXI, LAN eXtension Instrument), the precise timing synchronization is important.

In the factory automation control (e.g., manufacturing apparatus automation control or robot arm automation control) emphasizing the precise timing synchronization, the motion control, such as robot arm control, motor rotating speed control or the like, requests the highest communication timing synchronization. The timing synchronization has to be reached between a grand master and nodes, such as a robot arm and a motor. If the timing synchronization is not precise, the product may fail, thereby directly affecting the profit and causing great loss of money.

The Intranet measurement may be adapted to various environments such as a vehicle automation test production line, an airplane electronic apparatus test and a rocket launching base. Among these environments, the timing synchronization has to be reached between multiple computers, multiple machines and multiple sensing members so that signals returned by multiple sensing members may be measured in a specific time period and the signals may be analyzed subsequently.

In prior network timing synchronization, each network node, such as a provider edge (PE) router, a customer edge (CE) router, a customer premise equipment (CPE) or a gateway, needs to support a precision time protocol (PTP) and a best master clock (BMC) algorithm.

FIG. 1A (Prior Art) shows the prior art timing synchronization. As shown in FIG. 1A, a CPE 10 and a CPE 16 execute the BMC algorithm to determine the master and the slave (assume the CPE 10 is the master and the CPE 16 is the slave). Thereafter, the CPE 10 transmits a timing synchronization request packet to the CPE 16 through a PE router 12 and a CE router 14 so that the CPE 16 is in timing synchronization with the CPE 10. In this associated technology, the mechanism is referred to as a "transmissive timing synchronization mechanism". That is, the CPE 10 and the CPE 16 respectively pertain to different sub-networks, and the timing synchronization request packet needs to transmit through multiple sub-networks, such as the sub-network between the CPE 10 and the PE router 12, the sub-network between the PE router 12 and the CE router 14, and the sub-network between the CE router 14 and the CPE 16. Thus, the timing synchronization request packet has a transmission delay.

In addition, if the CPE 10, which is originally the grand master, is removed or crashed, the nodes 12 to 16 cannot receive the timing synchronization request outputted from the CPE 10. Thus, the nodes 12~16 start to execute the BMC algorithm to determine which one should become a new grand master. Thus, the overall timing synchronization is disturbed. Taking the factory automation environment as an example, if the original grand master is removed or crashed, the timing information of the node (production line) is reset so that a failed product may be obtained.

FIG. 1B is a schematic illustration showing how the prior art adds a new node or a hack node. As shown in FIG. 1B, when a new CPE 18 is added, the new CPE 18 outputs the best timing synchronization request packet Ebest to all the nodes 10~16 to request other nodes to be in timing synchronization with itself and to determine the master-slave relationship again. Because all the nodes need to execute the BMC again to determine a new master-slave relationship, the timing synchronization between all the nodes is disturbed. So, the overall timing synchronization is negatively influenced. More particularly, it is not allowed to disturb the timing information of other timing synchronized nodes in the factory automation environment, because a failed product may be obtained due to disturbance of the timing synchronization.

More particularly, if the new CPE 18 is a hack node, the hack node outputs the best timing synchronization request packet Ebest to nodes 10~16 to force nodes 10~16 to become the slave nodes and to make itself become the master node, thereby causing the problem in security.

SUMMARY

Consistent with the invention, there is provided a network connection apparatus, and a communication system and a communication method applying the same.

According to an exemplary embodiment consistent with the invention, there is provided a communication system is provided. The communication system includes a grand master and at least one sub-network. The sub-network is coupled to the grand master and includes at least one first node and a network connection apparatus coupled to and between the grand master and the first node. The network connection apparatus accepts a timing information from the grand master to achieve timing synchronization between the network connection apparatus and the grand master. The network connection apparatus outputs a first timing synchronization request packet to the first node based on a timing information of the network connection apparatus to request the first node to be in timing synchronization with the network connection apparatus.

Also according to an exemplary embodiment consistent with the invention, a network connection apparatus applied in a communication system is provided. The communication system includes a grand master and a first node. The network connection apparatus includes a plurality of connection ports, a timing synchronization module and a network connection module. A first connection port of the connection ports is connected to the grand master, and a second connection port of the connection ports is connected to the first node. The timing synchronization module is coupled to the connection ports. A first timing synchronization request packet transmitted from the grand master is transmitted to the timing synchronization module through the first connection port to achieve timing synchronization between the grand master and the network connection apparatus. The timing synchronization module further outputs a second timing synchronization request packet to the first node through the second connection port to achieve timing synchronization between the network connection apparatus and the first node. The network connection module coupled to the connection ports is for performing a packet-associated function.

Further, according to an exemplary embodiment consistent with the invention, a communication method adapted in a communication system is provided. The communication system includes a grand master, at least one first node and a network connection apparatus. The communication method includes the steps of: accepting, by the network connection apparatus, a timing information from the grand master to achieve timing synchronization between the network connection apparatus and the grand master; and outputting, by the network connection apparatus, a first timing synchronization request packet to the first node based on a timing information of the network connection apparatus and requesting the first node to achieve timing synchronization between the network connection apparatus and the first node.

It is to be understood that both the foregoing general description and the following detailed description are exemplary and explanatory only and are not restrictive of the invention, as claimed.

DETAILED DESCRIPTION

Consistent with the invention, there is provided a device and a system capable of achieving the precise timing synchronization so that the timing synchronization between the grand master and the nodes (e.g., the production line, robot arm, motor and the like) may be achieved.

In the embodiment consistent with the invention, a network connection apparatus and a communication system applying the same are provided. The network connection apparatus is in timing synchronization with a grand master. The network connection apparatus requests a slave node to achieve the timing synchronization between itself and the slave node. Thus, the timing synchronization between the grand master, the network connection apparatus and the slave node may be achieved.

In the exemplary embodiment consistent the invention, there is provided a network connection apparatus and a communication system applying the same are provided. When a new node is added, the new node is forced to become a slave node, and a timing synchronization request packet outputted from the new node is blocked by the network connection apparatus to prevent disturb or influence of the timing synchronization between other nodes.

In the exemplary embodiment consistent the invention, there is provided a network connection apparatus and a communication system applying the same are provided. When the grand master is removed or crashed, the network connection apparatus continuously performs the timing synchronization with the slave nodes to prevent the timing synchronization between all other slave nodes from being influenced.

In the exemplary embodiment consistent the invention, there is provided a network connection apparatus and a communication system applying the same are provided. When a hack node is added, the best timing synchronization request packet outputted from the hack node is blocked by the network connection apparatus to prevent the timing synchronization between all nodes from being influenced. In addition, the connection port of the network connection apparatus, which is connected to the hack node, is shut off, to block all packets outputted from the hack node.

In the exemplary embodiment consistent the invention, there is provided a slave node in the communication network can selectively support a best master clock (BMC, best master clock) algorithm.

Figure 1A:
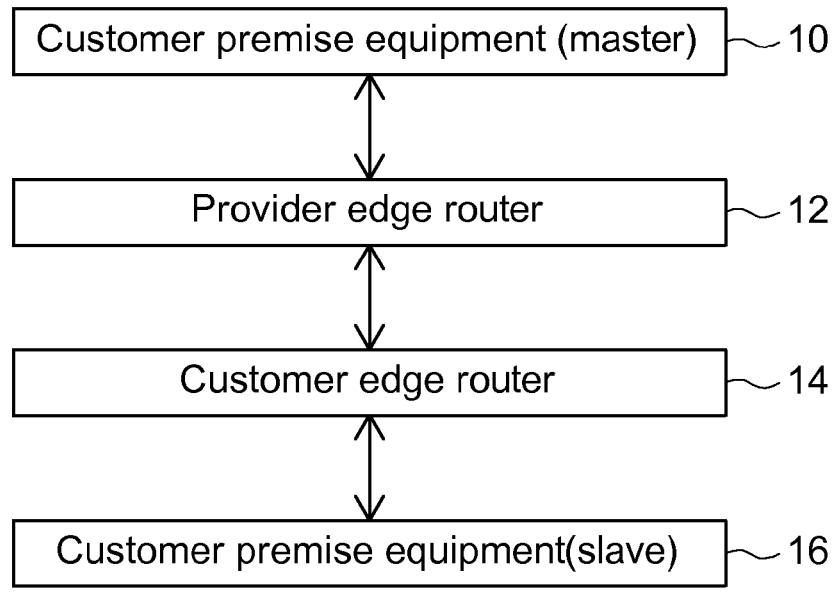
FIGS. 1A and 1B (Prior Art) are schematic illustrations showing the operations of achieving timing synchronization and adding a new node according to the prior art.
Figure 1B:
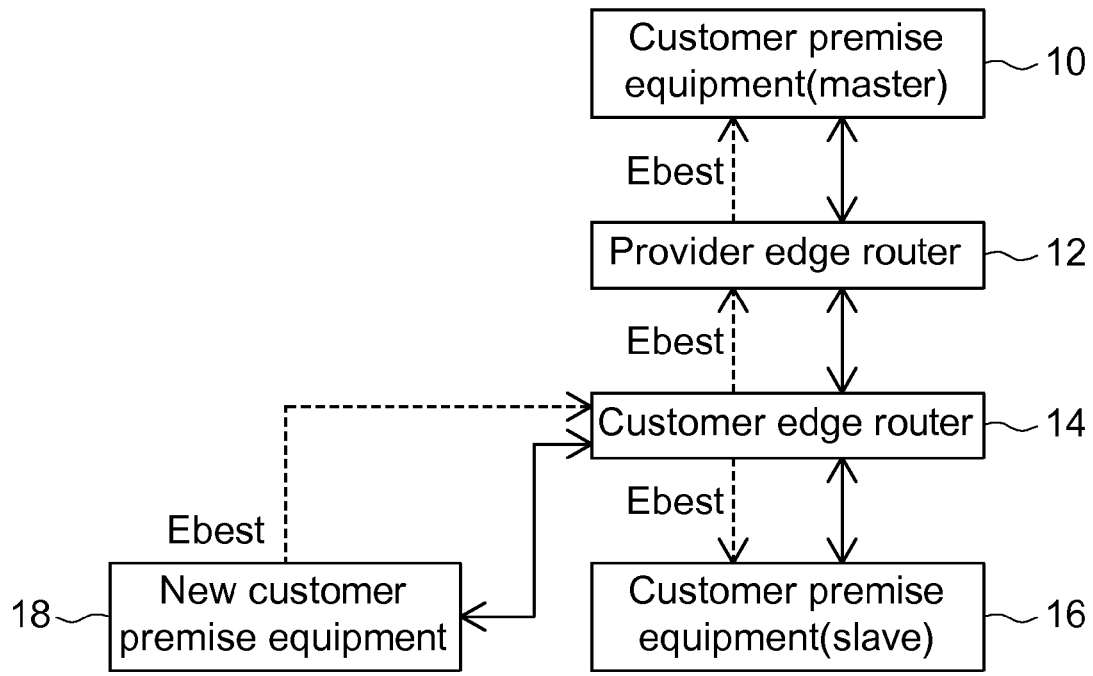
Figure 2A:
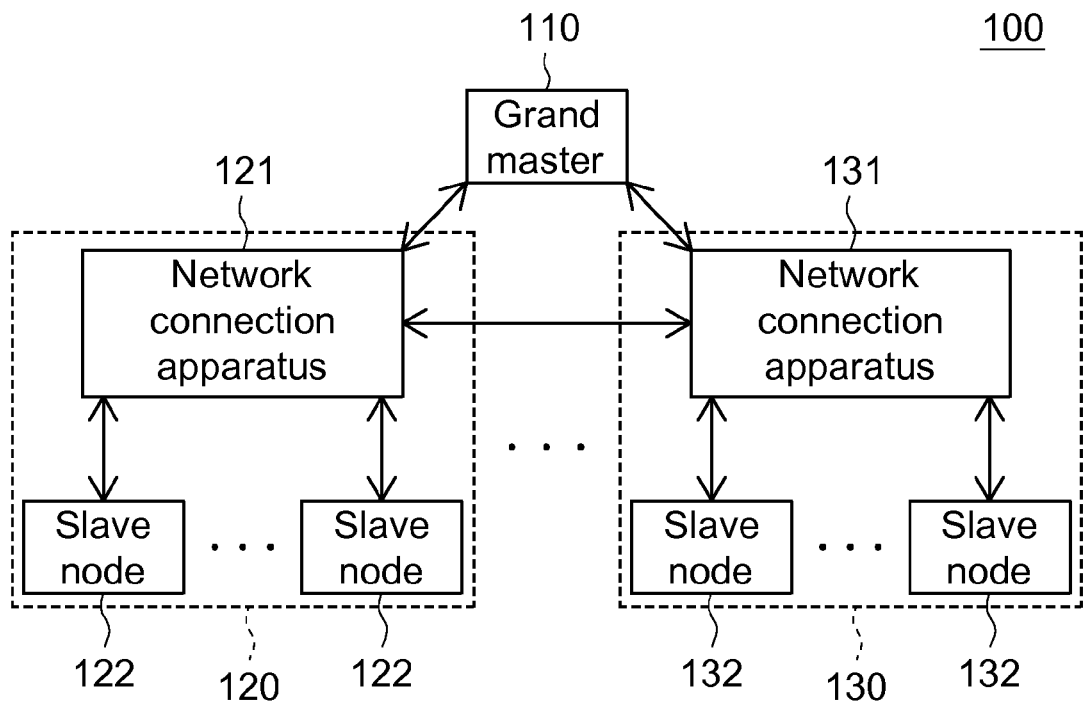
FIG. 2A is a schematic illustration showing a communication system according to an exemplary embodiment consistent with the invention.

FIG. 2A is a schematic illustration showing a communication system 100 according to an exemplary embodiment consistent the invention. Referring to FIG. 2A, the communication system 100 includes a grand master 110 and multiple sub-networks 120 and 130. The sub-network 120 includes a network connection apparatus 121 and multiple slave nodes 122. The sub-network 130 includes a network connection apparatus 131 and multiple slave nodes 132. In this embodiment, the sub-network includes, without limitation to, a packet network, such as an Internet protocol (IP) network. One of ordinary skill in the art may understand that the invention is not restricted by the number and the types of sub-networks although only two sub-networks are illustrated in FIG. 2A.

Taking the factory automation environment as an example, the two sub-networks may be regarded as two zones for factory automation. The two zones may be, for example, a yellow zone and an etching zone in a semiconductor wafer factory, or an automation robot arm and a production line in a vehicle foundry.

The grand master 110 and the network connection apparatuses 121 and 131 support the best master clock (BMC) algorithm and a precision time protocol (PTP).

In this embodiment, the grand master 110 is always the master node, and the timing information of the grand master 110 is the standard time of the communication system 100. The network connection apparatuses 121 and 131 inside the communication system 100 have to be in timing synchronization with the grand master 110. The grand master 110 periodically (e.g., every two seconds) outputs the timing synchronization request to the network connection apparatuses 121 and 131 and the network connection apparatuses 121 and 131 also periodically output the timing synchronization requests to the slave nodes 122 and 132. Thus, it is possible to ensure that the timing synchronization between all nodes inside the communication system 100 may be held.

Between the network connection apparatuses 121, 131 and the grand master 110, the network connection apparatuses 121 and 131 are slave nodes. However, between the network connection apparatuses 121, 131 and the slave nodes 122, 132, the network connection apparatuses 121 and 131 are master nodes. In other words, in the sub-networks 120 and 130, the the network connection apparatuses 121 and 131 are the master nodes, and other nodes are slave nodes.

In this embodiment, each of the network connection apparatuses 121 and 131 includes, without limitation to, a gateway, a router, a switch, a bridge, or the like. In this embodiment, the network connection apparatuses 121 and 131 can dispatch, forward or switch the packet. The network connection apparatuses 121 and 131 are connected to multiple networks. The sub-networks 120 and 130 may adopt the same communication protocol or different communication protocols. In this embodiment, the network connection apparatus has a boundary timing synchronization mechanism so that the timing synchronization between the grand master, the network connection apparatus and the slave node is achieved, wherein the details will be described in the following.

In the exemplary embodiment consistent with the invention, any one slave node may or may not support the BMC algorithm. The salve node may selectively support the BMC algorithm. In the embodiment of the invention, the network connection apparatus sets itself as the master node and sets other nodes as slave nodes in the same sub-network, regardless of whether the slave node supports the BMC algorithm or not. That is, even if the node supporting the BMC algorithm completely executes the BMC algorithm, the node is still the slave node and cannot become the master node. In addition, all the slave nodes have to support the PTP in the embodiment of the invention.

Figure 2B:
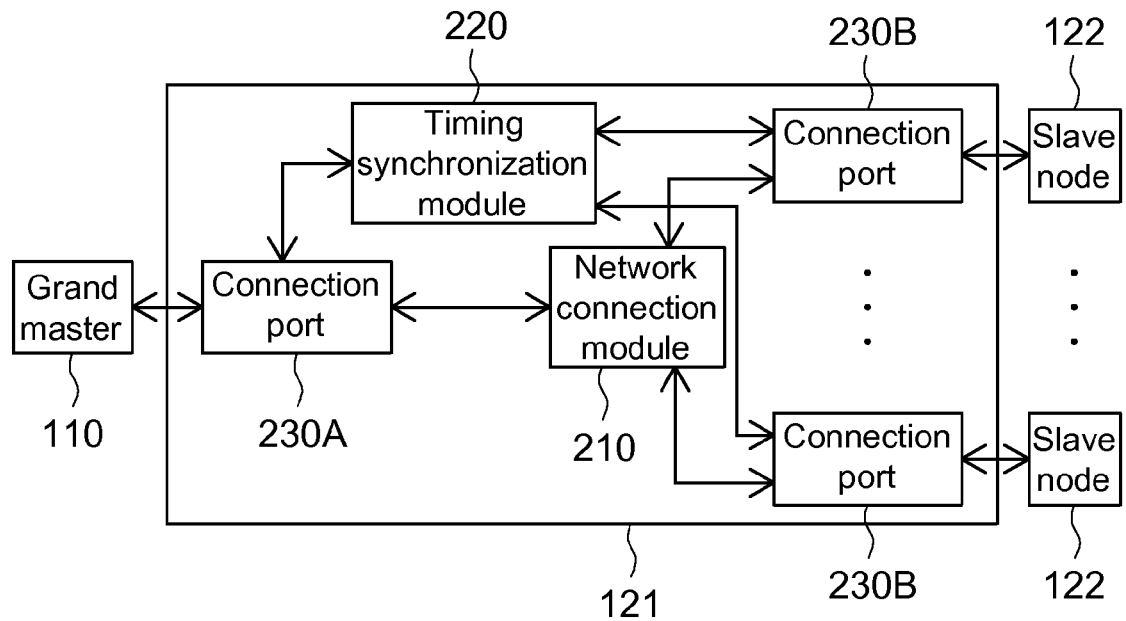
FIG. 2B is a schematic illustration showing a network connection apparatus according to an exemplary embodiment consistent with the invention.

FIG. 2B is a schematic illustration showing the network connection apparatus 121 according to the embodiment of the invention. Referring to FIG. 2B, the network connection apparatus 121 includes a network connection module 210, a timing synchronization module 220, a connection port 230A and multiple connection ports 203B. In general, there is only one connection port 230A.

The network connection module 210 executes the packet dispatching, packet forwarding and packet switching functions, which may also be referred to as packet-associated functions.

The timing information transmitted from the grand master 110 may be transmitted to the timing synchronization module 220 through the connection port 230A. The timing synchronization module 220 may execute the timer function. That is, the timing information of the timing synchronization module 220 is the timing information of the network connection apparatus. In addition, the timing synchronization module 220 also supports the PTP algorithm and the BMC algorithm.

When the network connection apparatus (i.e. the timing synchronization module 220) is timing synchronized with the grand master 110, the timing synchronization module 220 calculates the sync time with transmission delay for slave node 122; and with the sync time, the slave node 122 will later be synchronized. The timing synchronization module 220 transmits the sync time information by a packet to the slave node 122 through the connection port 230B for doing timing synchronization. Thus, the timing synchronization between the network connection apparatus 121 and the slave node 122 is achieved.

The connection ports 230A and 230B of the network connection apparatus 121 support the PTP algorithm and the BMC algorithm. The BMC algorithm is performed between the connection port 230A (which is connected to the grand master 110) and the grand master 110, to decide the grand master 110 as the master node and the connection ports 230A and 230B as the slave nodes. In addition, it is possible to decide which one of the connection ports 230A and 230B has to be connected to the grand master 110 externally or dynamically. After the BMC algorithm is completely executed, the PTP algorithm is executed between the connection port 230A of the network connection apparatus 121 and the grand master 110, so that the connection port 230A can receive the timing information transmitted from the grand master 110, and can transmit the timing information to the timing synchronization module 220.

Thereafter, the timing synchronization module 220 outputs its own timing information to other connection ports 230B. There is only one grand master 110 inside the communication system 100, so the slave node 122 is connected to other connection ports 230B once the connection port 230A is decided to be connected to the grand master 110.

If the slave node supports the BMC algorithm, then the connection ports 230B forces the network connection apparatus 121 to become the master node (this is referred to as "master only" mechanism) after the connection ports 230B of the network connection apparatus 121 and the slave node 122 completely execute the BMC algorithm. On the other hand, if the slave node does not support the BMC algorithm, the connection ports 230B may also force the network connection apparatus 121 to become the master node although the BMC algorithm is not executed between the connection port 230B and the slave node 122.

In addition, even if a new node is added to the sub-network (i.e., the newly added node is connected to the connection port 230B), the connection port 230B may also force the network connection apparatus 121 to become the master node and the new node to become the slave node.

However, if the new node cannot be forced to become the slave node, the new node is regarded as a hack node in the embodiment of the invention, and the connection port 230B connected to the new node is shut off. Thus, the network connection apparatus 121 may prevent the hack node from improperly outputting the timing synchronization request to disturb the timing synchronization of the sub-network (and the overall communication system).

After the connection port 230B receives the timing information transmitted from the timing synchronization module 220, it outputs the timing synchronization request packet to the slave node 122 to achieve the timing synchronization between the network connection apparatus 121 and the slave node 122.

As mentioned hereinabove, a slave node, which does not support the BMC algorithm, is further provided according to the embodiment of the invention. The software/hardware in the slave node, which does not support the BMC algorithm, still supports the PTP. Thus, it is possible to simplify the software/hardware of the slave node and thus lower the cost of the slave node. Because the software/hardware of the slave node needs not to operate the BMC algorithm, the operation loading of the software/hardware of the slave node may be further lowered. More particularly, the timing synchronization between the slave node and the grand master may further be accelerated because the time taken in completing the BMC algorithm is saved.

Boundary Timing Synchronization Mechanism

Figure 3:
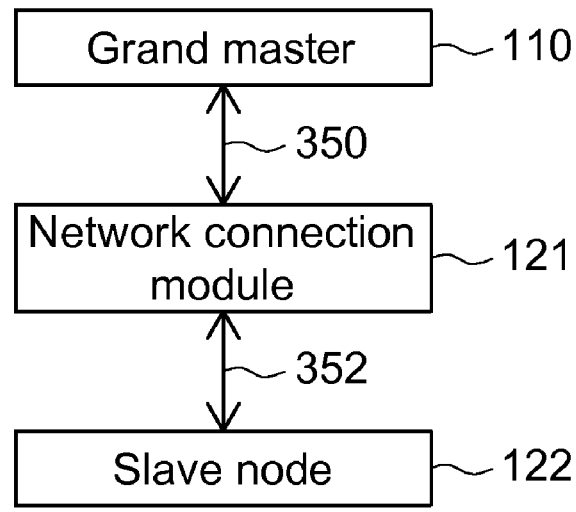
FIG. 3 is a schematic illustration showing a timing synchronization mechanism according to an exemplary embodiment consistent with the invention.

The embodiment of the invention provides a boundary timing synchronization mechanism. FIG. 3 is a schematic illustration showing a timing synchronization mechanism according to the embodiment of the invention.

In the embodiment of the invention, the timing synchronization request packet needs not to transmit through multiple sub-networks. As shown in FIG. 3, the grand master 110 and the slave node 122 respectively pertain to different sub-networks. First, the grand master 110 and the network connection apparatus 121 execute the BMC algorithm to decide the master-slave relationship (i.e. to decide which is master and which is slave). Because the grand master is always the master, the grand master 110 becomes the master and the network connection apparatus 121 becomes the slave after the BMC algorithm is executed.

After the relationship between the master and the slave is decided, the grand master 110 outputs the timing synchronization request packet to the network connection apparatus 121. After receiving the packet, the network connection apparatus 121 adjusts its timing information to be in synchronization with the timing information of the grand master 110. In here, the operation is referred to as "the network connection apparatus 121 accepts the timing information of the grand master 110". Thereafter, the network connection apparatus 121 is in charge of calculating the sync timing with which the slave node 122 will later be synchronized and the network connection apparatus 121 transmit the sync time information packet to the slave node 122 to achieve the timing synchronization between the network connection apparatus 121 and the slave node 122. That is, the slave node 122 is not directly in timing synchronization with the grand master 110.

According to the embodiment of FIG. 3, it is obtained that the transmission delay between the grand master 110 and the network connection apparatus 121 is a trace delay 350 which represents the transmission delay caused by the trace between the grand master 110 and the network connection apparatus 121. In addition, the slave node 122 accepts the timing information of the network connection apparatus 121. Thus, the transmission delay is caused by the trace between the network connection apparatus 121 and the slave node 122 and is referred to as a trace delay 352.

In this embodiment, the timing synchronization request packet transmitted from the grand master 110 to the network connection apparatus 121 is transmitted along the upper boundary ranging between the grand master 110 and the network connection apparatus 121. The timing synchronization request packet transmitted from the network connection apparatus 121 to the slave node 122 is transmitted along the lower boundary ranging between the network connection apparatus 121 and the slave node 122. Nevertheless, the timing synchronization request packet will not transmit through different sub-networks. In this embodiment, this is why this mechanism is referred to as the boundary timing synchronization mechanism.

In this embodiment, the transmission delay of the timing synchronization request packet occurs between the network connection apparatus 121 and the slave node 122. So, the timing synchronization has the higher precision.

New Node Added

Figure 4:
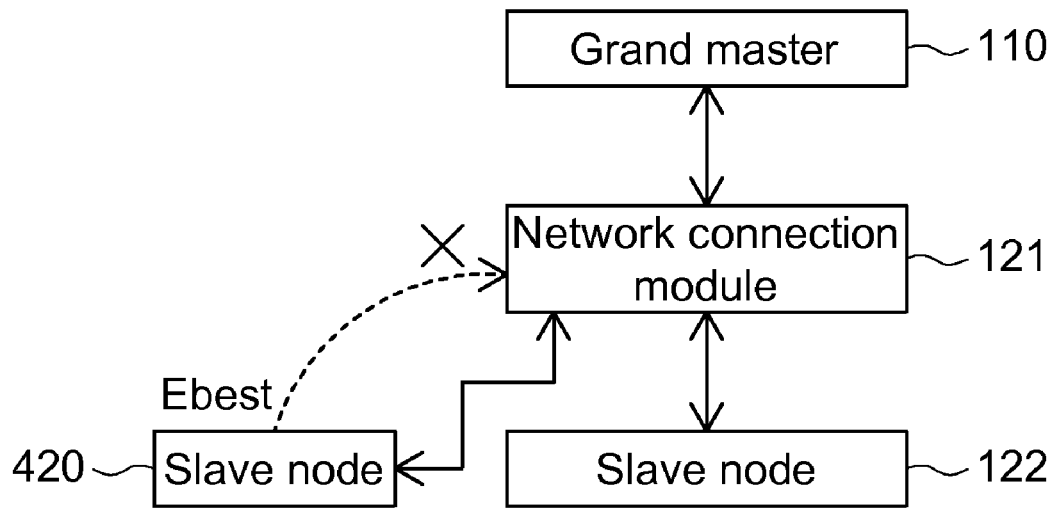
FIG. 4 is a schematic illustration showing the addition of a new node according to an exemplary embodiment consistent with the invention.

FIG. 4 is a schematic illustration showing the operation of adding a new node according to the embodiment of the invention. As shown in FIG. 4, the connection port 230B of the network connection apparatus 121 in this embodiment has the "master only" mechanism. When a new node 420 is added, the new node 420 tries to output the best timing synchronization request packet Ebest to the network connection apparatus 121. However, the associated connection port 230B of the network connection apparatus 121 has been set to be master, so the new node 420 will be set to be slave. In addition, the best timing synchronization request packet Ebest outputted from the new node 420 is blocked by the network connection apparatus 121. That is, the best timing synchronization request packet Ebest outputted from the new node 420 cannot be transmitted to other slave node.

Consequently, even if the new node is added, the existing slave node 122 will not execute the BMC algorithm again, and the network connection apparatus still controls the timing synchronization in this embodiment. So, the timing synchronization between the existing nodes will not be disturbed. Taking the factory automation environment as an example, other nodes still can work normally and the overall production process will not be interfered by the newly added node.

Removing or Crash of Grand Master Node

Figure 5:
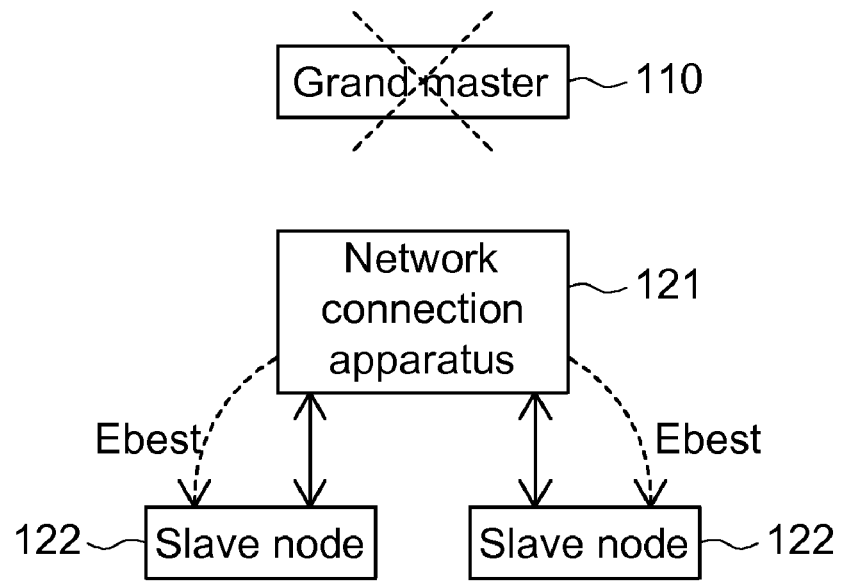
FIG. 5 is a schematic illustration showing the removing or crash of a grand master node in an exemplary embodiment consistent with the invention.

FIG. 5 is a schematic illustration showing the removing or crash of the grand master node in the embodiment of the invention. As shown in FIG. 5, if the grand master 110 is crashed or removed in this embodiment, the network connection apparatus 121 continuously performs the timing synchronization with the slave node 122 based on the timing information of the network connection apparatus 121. Therefore, all the slave nodes 122 still synchronously and normally operate. Thus, even if the grand master is removed or crashed, the overall production process will not be interfered in this embodiment.

Safety Guard

Figure 6:
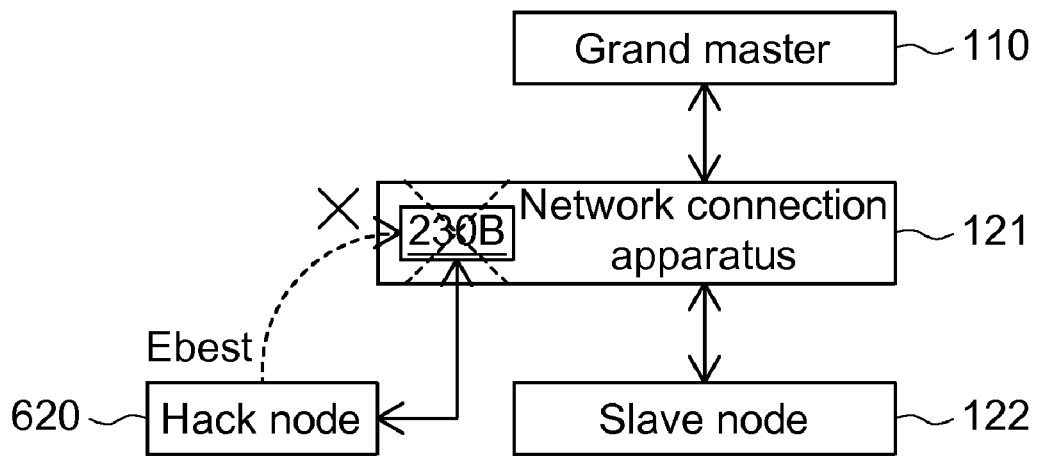
FIG. 6 is a schematic illustration showing the condition when a hack node is added in an exemplary embodiment consistent with the invention.

FIG. 6 is a schematic illustration showing the condition when a hack node is added in the embodiment of the invention. As shown in FIG. 6, the connection port 230B of the network connection apparatus 121 in this embodiment has the "master only" mechanism and can block/filter the best timing synchronization request packet Ebest outputted by a newly added hack node 620 to prevent the packet from being introduced into other nodes 122 inside the communication system 100.

When a new node is added, the connection port 230B having the "master only" mechanism outputs the best timing synchronization request packet Ebest to request the new node to become the slave node. If the network connection apparatus 121 finds that the newly added node does not accept to be set to become the slave node, or the network connection apparatus 121 finds that the newly added node also outputs the best timing synchronization request packet Ebest, the network connection apparatus 121 regards the node as the hack node, and automatically shuts off the connection port connected to the hack node.

In the normal application, the timing information of the slave node (production line) has to be calibrated, and the slave node will not output the best timing synchronization request packet Ebest. Only the hack node will try to output the best timing synchronization request packet Ebest.

Flow Chart

Figure 7:
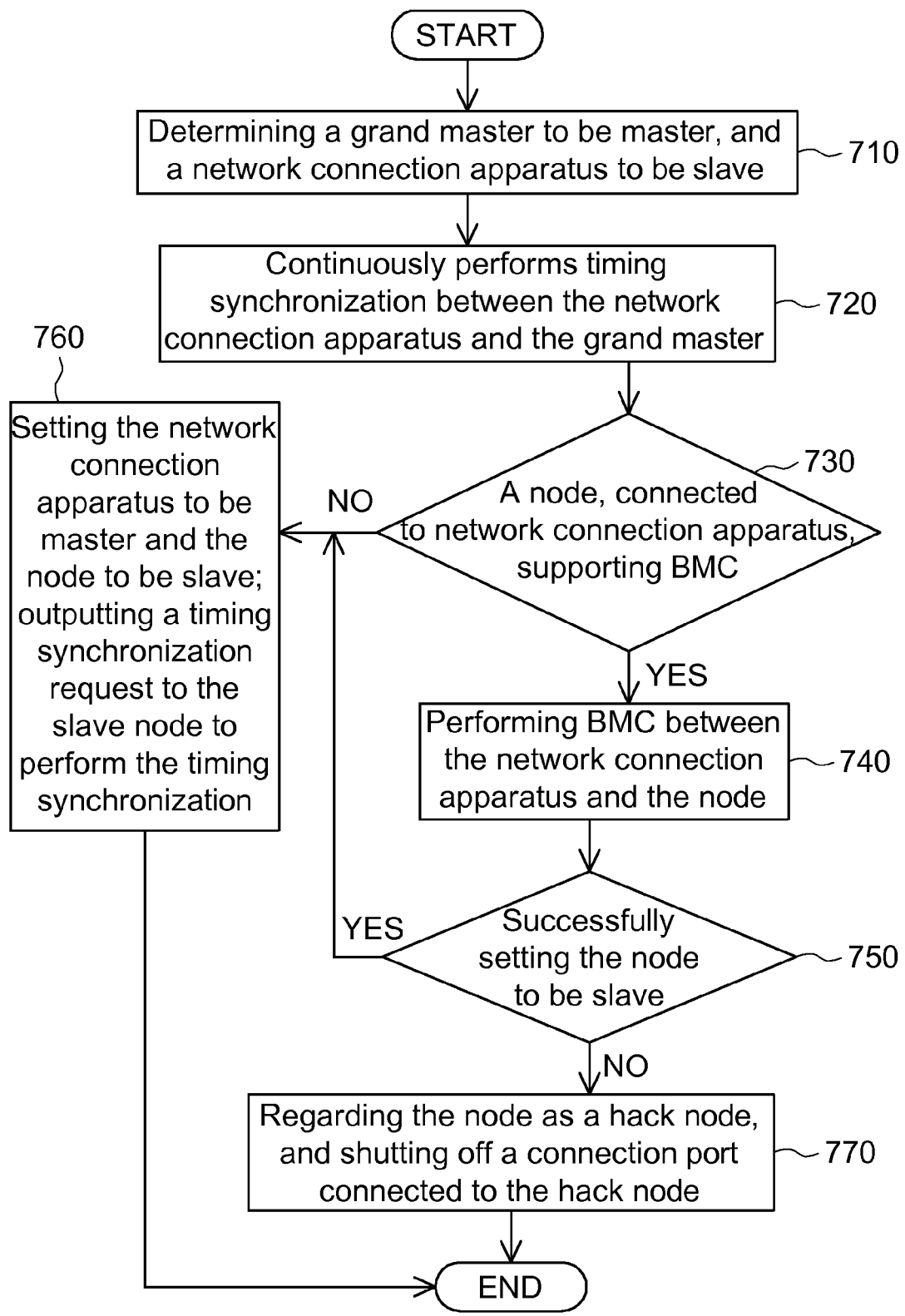
FIG. 7 is a flow chart showing the operations according to the embodiment of the invention.

FIG. 7 is a flow chart showing the operations according to the embodiment of the invention. As shown in FIG. 7, in step 710, the grand master and the network connection apparatus execute the BMC algorithm to decide the grand master to be the master and the network connection apparatus to be the slave. Next, in step 720, the network connection apparatus is continuously in timing synchronization with the grand master.

Next, in step 730, when a node is connected to the network connection apparatus, it is judged whether the node connected to the network connection apparatus supports the BMC algorithm or not. If yes, the procedure goes to step 740; or otherwise the procedure goes to step 760.

In the step 740, the BMC algorithm is executed between the network connection apparatus and the node supporting the BMC algorithm, to decide which is master and which is slave.

In step 750, it is judged whether the node accepts to be set to the slave node or not. If yes, the procedure goes to the step 760; or otherwise the procedure goes to step 770.

In the step 760, the network connection apparatus is set as the master, and this node is set as the slave. The network connection apparatus actively outputs the timing synchronization request to the slave node to perform the timing synchronization. Thus, it is possible to complete the timing synchronization between the grand master, the network connection apparatus and the slave node.

In the step 770, the network connection apparatus regards the node as a hack node, and it shuts off the connection port connected to the hack node.

In summary, in the embodiment of the invention, the network connection apparatus requests all slave nodes on the same sub-network to be in timing synchronization with itself. The grand master does not request the slave nodes to be in timing synchronization with itself. In addition, the grand master requests the network connection apparatus on each sub-network to be in timing synchronization with itself. Thus, the timing synchronization synchronization between all the nodes in the overall communication system may be achieved. Even when the grand master is removed or crashed, when a new slave node is added, or when a hack node wants to hack, the timing synchronization between all the nodes inside the communication system still can be held and is not negatively affected.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A communication system, comprising:
   a grand master; and
   at least one sub-network, coupled to the grand master, comprising:
   at least one first node; and
   a network connection apparatus, coupled to and between the grand master and the at least one first node, wherein the network connection apparatus accepts a timing information from the grand master to achieve timing synchronization between the network connection apparatus and the grand master, and the network connection apparatus outputs a first timing synchronization request packet to the at least one first node based on the timing information of the network connection apparatus, to request the at least one first node to be in the timing synchronization with the network connection apparatus;
   wherein the network connection apparatus acts as a master to calculate a sync time and provide the sync time to the at least one first node and forces the at least one first node to be a slave and synchronized with the sync time;
   wherein the grand master and the network connection apparatus support a best master clock (BMC) algorithm for determining a master-slave relationship between the grand master and the network connection apparatus, when the at least one first node does not support the BMC algorithm, the network connection apparatus forces the at least one first node to be a slave without executing the BMC algorithm.

2. The system according to claim 1, wherein:
   the grand master is master and the network connection apparatus is slave, between the grand master and the network connection apparatus; and
   the network connection apparatus is master and the at least one first node is slave, between the network connection apparatus and the at least one first node.

3. The system according to claim 1, wherein when the network connection apparatus accepts the timing information from the grand master, the grand master outputs a second timing synchronization request packet to the network connection apparatus to achieve the timing synchronization therebetween, and the second timing synchronization request packet is transmitted along a boundary between the grand master and the network connection apparatus.

4. The system according to claim 1, wherein the first timing synchronization request packet outputted from the network connection apparatus is transmitted along a boundary between the network connection apparatus and the at least one first node.

5. The system according to claim 1, wherein when a second node is newly added to the sub-network, the network connection apparatus forces the second node to be a slave, and the network connection apparatus stops a third timing synchronization request packet outputted from the second node.

6. The system according to claim 1, wherein when the grand master is removed or crashed, the network connection apparatus still timely requests the at least one first node to be in timing synchronization with the network connection apparatus, to continue achieving the timing synchronization therebetween.

7. The system according to claim 1, wherein:
   when a hack node is newly added to the sub-network, the network connection apparatus tries to force the hack node to be a slave; and
   if the network connection apparatus cannot force the hack node to be the slave, a connection port of the network connection apparatus, which is connected to the hack node, is shut off, and the network connection apparatus stops a fourth timing synchronization request packet outputted from the hack node.

8. The system according to claim 1, wherein the grand master and the network connection apparatus support a precision time protocol (PTP).

9. The system according to claim 1, wherein the at least one first node supports a precision time protocol (PTP), and the at least one first node supports or does not support the BMC algorithm.

10. The system according to claim 3, wherein the network connection apparatus comprises:
    a plurality of connection ports, wherein a first connection port of the connection ports is connected to the grand master, and a second connection port of the connection ports is connected to the at least one first node;
    a timing synchronization module coupled to the connection ports, wherein the second timing synchronization request packet transmitted from the grand master is transmitted to the timing synchronization module through the first connection port to achieve the timing synchronization between the grand master and the network connection apparatus, and the timing synchronization module further outputs the first timing synchronization request packet to the at least one first node through the second connection port to achieve the timing synchronization between the network connection apparatus and the at least one first node; and
    a network connection module, coupled to the connection ports, for performing a packet-associated function including packet transmitting, packet switching, packet dispatching or packet forwarding.

11. A network connection apparatus applied in a communication system, which comprises a grand master and a first node, the network connection apparatus comprising:
    a plurality of connection ports, wherein a first connection port of the connection ports is connected to the grand master, and a second connection port of the connection ports is connected to the first node;

a timing synchronization module coupled to the connection ports, wherein a first timing synchronization request packet transmitted from the grand master is transmitted to the timing synchronization module through the first connection port to achieve timing synchronization between the grand master and the network connection apparatus, the timing synchronization module outputs a second timing synchronization request packet to the first node through the second connection port to achieve timing synchronization between the network connection apparatus and the first node; and a network connection module, coupled to the connection ports, for performing a packet-associated function;

wherein the network connection apparatus acts as a master to calculate a sync time and provide the sync time to the first node and forces the first node to be a slave and synchronized with the sync time wherein the grand master and the network connection apparatus support a BMC algorithm for determining a master-slave relationship between the grand master and the network connection apparatus, when the first node does not support the BMC algorithm, the network connection apparatus forces the first node to be a slave without executing the BMC algorithm.

12. The apparatus according to claim 11, wherein:
the grand master is master and the network connection apparatus is slave between the grand master and the network connection apparatus; and
the network connection apparatus is master and the first node is slave between the network connection apparatus and the first node.

13. The apparatus according to claim 11, wherein the first timing synchronization request packet is transmitted along a boundary between the grand master and the network connection apparatus.

14. The apparatus according to claim 11, wherein the second timing synchronization request packet is transmitted along a boundary between the network connection apparatus and the first node.

15. The apparatus according to claim 11, wherein when a second node is newly connected to a third connection port of the connection ports of the network connection apparatus, the network connection apparatus forces the second node to be a slave, and the network connection apparatus stops a third timing synchronization request packet outputted from the second node.

16. The apparatus according to claim 11, wherein when the grand master is removed or crashed, the network connection apparatus still timely requests the first node to be in timing synchronization with the network connection apparatus to continue achieving the timing synchronization therebetween.

17. The apparatus according to claim 11, wherein:
when a hack node is newly connected to a fourth connection port of the connection ports of the network connection apparatus, the network connection apparatus tries to force the hack node to be a slave; and
if the network connection apparatus cannot force the hack node to be the slave, the fourth connection port is shut off and the network connection apparatus stops a fourth timing synchronization request packet outputted from the hack node.

18. The apparatus according to claim 11, wherein the grand master and the network connection apparatus support a precision time protocol (PTP), the first node supports the precision time protocol (PTP), and the first node selectively supports the BMC algorithm.

19. The apparatus according to claim 11, wherein the packet-associated function performed by the network connection module comprises packet transmitting, packet switching, packet dispatching or packet forwarding.

20. The apparatus according to claim 11, wherein the timing synchronization module is in charge of calculating the sync time with transmission delay for the first node, and outputs the sync time with a second timing synchronization request packet to the first node through the second connection port, then first node is synchronized to the timing synchronization module with the sync time.

21. A communication method applied in a communication system having a grand master, at least one first node and a network connection apparatus, the communication method comprising the steps of:
accepting, by the network connection apparatus, a timing information from the grand master to achieve timing synchronization between the network connection apparatus and the grand master; and
outputting, by the network connection apparatus, a first timing synchronization request packet to the at least one first node based on a timing information of the network connection apparatus, and requesting the first node to achieve timing synchronization between the network connection apparatus and the at least one first node, wherein the network connection apparatus acts as a master to calculate a sync time and provide the sync time to the at least one first node and forces the at least one first node to be a slave and synchronized with the sync time;
wherein the grand master and the network connection apparatus support a BMC algorithm for determining a master-slave relationship between the grand master and the network connection apparatus, when the at least one first node does not support the BMC algorithm, the network connection apparatus forces the at least one first node to be a slave without executing the BMC algorithm.

22. The method according to claim 21, further comprising the steps of:
setting the grand master to be master and the network connection apparatus to be slave between the grand master and the network connection apparatus; and setting the network connection apparatus to be master and the at least one first node to be slave between the network connection apparatus and the at least one first node.

23. The method according to claim 21, further comprising the steps of:
outputting, by the grand master, a second timing synchronization request packet to the network connection apparatus to achieve the timing synchronization therebetween, wherein the second timing synchronization request packet is transmitted along a boundary between the grand master and the network connection apparatus.

24. The method according to claim 21, wherein the first timing synchronization request packet outputted from the network connection apparatus is transmitted along a boundary between the network connection apparatus and the at least one first node.

25. The method according to claim 21, further comprising the steps of:
when a second node is newly added, setting, by the network connection apparatus, the second node to be a slave, and stopping, by the network connection apparatus, a third timing synchronization request packet outputted from the second node.

26. The method according to claim 21, further comprising the step of:

when the grand master is removed or crashed, timely requesting, by the network connection apparatus, the at least one first node to be in timing synchronization with the network connection apparatus to continue achieving the timing synchronization therebetween.

27. The method according to claim 21, further comprising the step of:
when a hack node is newly added, trying, by the network connection apparatus, to set the hack node to be a slave, if the network connection apparatus cannot set the hack node to be the slave, a connection port of the network connection apparatus, which connected to the hack node, is shut off, and the network connection apparatus stops a fourth timing synchronization request packet outputted from the hack node.

28. The method according to claim 21, wherein the grand master and the network connection apparatus support a precision time protocol (PTP).

29. The method according to claim 21, wherein the at least one first node supports a precision time protocol (PTP), and the at least one first node selectively supports the BMC algorithm.

* * * * *